United States Patent
Evans et al.

(10) Patent No.: US 11,248,622 B2
(45) Date of Patent: Feb. 15, 2022

(54) REPEATING AIRFOIL TIP STRONG PRESSURE PROFILE

(71) Applicant: United Technologies Corporation, Farmington, CT (US)

(72) Inventors: Simon W. Evans, Farmington, CT (US); Yuan Dong, Glastonbury, CT (US); Sean Nolan, Wethersfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 284 days.

(21) Appl. No.: 15/255,663

(22) Filed: Sep. 2, 2016

(65) Prior Publication Data
US 2018/0066673 A1 Mar. 8, 2018

(51) Int. Cl.
*F04D 29/38* (2006.01)
*F01D 5/14* (2006.01)
(Continued)

(52) U.S. Cl.
CPC .......... *F04D 29/384* (2013.01); *F01D 5/145* (2013.01); *F04D 19/02* (2013.01); *F04D 29/324* (2013.01);
(Continued)

(58) Field of Classification Search
CPC .......... F05D 2210/30; F05D 2270/301; F05D 2270/3011; F05D 2270/3013;
(Continued)

(56) References Cited

U.S. PATENT DOCUMENTS 2,746,672 A * 5/1956 Doll, Jr. ................ F04D 29/544
415/192
3,918,832 A * 11/1975 Shuttleworth .......... F01D 9/042
415/193
(Continued)

FOREIGN PATENT DOCUMENTS

DE 102011012039 A1 8/2012
EP 0251978 A2 1/1988
(Continued)

OTHER PUBLICATIONS

Chang, Hao et al., "Effect of blade sweep on inlet flow in axial compressor cascades" Dec. 26, 2014. Chinese Journal of Aeronautics, vol. 28, No. 1, pp. 103-111.
(Continued)

*Primary Examiner* — J. Todd Newton
*Assistant Examiner* — Cameron A Corday
(74) *Attorney, Agent, or Firm* — Carlson, Gaskey & Olds, P.C.

(57) ABSTRACT

A compressor section for a gas turbine engine includes a blade including a platform, a tip and an airfoil extending between the platform and tip. The airfoil includes a root portion adjacent to the platform, a midspan portion and a tip portion. Each of the root portion, midspan portion and tip portion define a meridional velocity at stage exit with the tip portion including a first meridional velocity greater than a second meridional velocity of the midspan portion. A blade for an axial compressor of a gas turbine engine and a method of operating a compressor section of a gas turbine engine are also disclosed.

20 Claims, 4 Drawing Sheets

(51) Int. Cl.
    *F04D 19/02*     (2006.01)
    *F04D 29/32*     (2006.01)

(52) U.S. Cl.
    CPC .. *F05D 2210/30* (2013.01); *F05D 2220/3216* (2013.01); *F05D 2240/307* (2013.01); *F05D 2260/821* (2013.01); *F05D 2270/3013* (2013.01); *Y02T 50/60* (2013.01)

(58) Field of Classification Search
    CPC ....... F05D 2270/3015; F05D 2270/102; F04D 29/324; F04D 29/384; F01D 5/14
    See application file for complete search history.

(56) References Cited

U.S. PATENT DOCUMENTS

| | | | |
|---|---|---|---|
| 4,238,170 A * | 12/1980 | Robideau | F01D 11/08 |
| | | | 415/173.5 |
| 4,678,398 A | 7/1987 | Dodge et al. | |
| 4,741,667 A * | 5/1988 | Price | F01D 5/141 |
| | | | 415/115 |
| 5,624,234 A * | 4/1997 | Neely | F04D 29/326 |
| | | | 416/189 |
| 6,206,642 B1 | 3/2001 | Matheny et al. | |
| 6,431,829 B1 | 8/2002 | Watanabe et al. | |
| 7,686,567 B2 | 3/2010 | Grover et al. | |
| 8,133,012 B2 * | 3/2012 | Nagai | F01D 5/141 |
| | | | 415/149.1 |
| 8,684,698 B2 | 4/2014 | Breeze-Stringfellow et al. | |
| 9,017,036 B2 | 4/2015 | Straccia | |
| 9,017,037 B2 * | 4/2015 | Baltas | F01D 5/141 |
| | | | 416/243 |
| 9,279,329 B2 * | 3/2016 | Myoren | F01D 5/141 |
| 2010/0183424 A1 | 7/2010 | Roy | |
| 2010/0215503 A1 * | 8/2010 | Myoren | F01D 5/141 |
| | | | 416/223 A |
| 2012/0243983 A1 | 9/2012 | Breeze-Stringfellow et al. | |
| 2012/0244005 A1 | 9/2012 | Breeze-Stringfellow et al. | |

FOREIGN PATENT DOCUMENTS

| | | | | |
|---|---|---|---|---|
| GB | 887083 A * | 1/1962 | ......... | F04D 19/028 |
| WO | 2014149354 A1 | 9/2014 | | |
| WO | 2015/126452 A1 | 8/2015 | | |

OTHER PUBLICATIONS

Eder, E. "Axial compressor blade design for desensitization of aerodynamic performance and stability to tip clearance". Department de genie mecanique ecole polytechnique de montreal. Dec. 1, 2012. pp. 6-11.

Extended European Search Report for EP Application No. 17189104.7 dated Feb. 7, 2018.

* cited by examiner

REPEATING AIRFOIL TIP STRONG PRESSURE PROFILE

STATEMENT REGARDING FEDERALLY SPONSORED RESEARCH OR DEVELOPMENT

The subject of this disclosure was made with government support under Contract No.: NNC14CA36C awarded by NASA. The government therefore may have certain rights in the disclosed subject matter.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan sections. The compressor section typically includes low and high pressure compressors, and the turbine section includes low and high pressure turbines.

An axial compressor includes a plurality of stages, each including two rows of airfoils—one rotating row, followed by one stationary row. A clearance between the tip of each rotating airfoil and the housing or other static structure is controlled and minimized to improve efficiency. As the size of the compressor decreases the relative size of the clearance gap relative to both the blade span and chord, increases. A clearance to span and a clearance to chord ratios are larger for smaller compressors. Larger clearance to chord ratios can contribute to instability of the flow through the compressor airfoil row.

Turbine engine manufacturers continue to seek further improvements to engine performance including improvements to thermal, transfer and propulsive efficiencies.

SUMMARY

In a featured embodiment, a compressor section for a gas turbine engine includes a blade including a platform, a tip and an airfoil extending between the platform and tip. The airfoil includes a root portion adjacent to the platform, a midspan portion and a tip portion. Each of the root portion, midspan portion and tip portion define a meridional velocity at stage exit with the tip portion including a first meridional velocity greater than a second meridional velocity of the midspan portion.

In another embodiment according to the previous embodiment, the tip portion includes between 65% and 100% of a radial span of the airfoil and the midspan portion includes between 20% and 65% of the radial span of the airfoil.

In another embodiment according to any of the previous embodiments, the first meridional velocity produced at stage exit is between 6% and 15% greater than the second meridional velocity through the midspan portion.

In another embodiment according to any of the previous embodiments, a first total pressure within the tip portion at stage exit is greater than a second total pressure across the midspan portion at stage exit.

In another embodiment according to any of the previous embodiments, the first total pressure at stage exit is between 1.2% and 3% greater than a second total pressure across the midspan portion at stage exit.

In another embodiment according to any of the previous embodiments, the compressor section includes a plurality of stages and the blade includes a portion of at least one stage of the compressor section.

In another embodiment according to any of the previous embodiments, at least one stage of the compressor section includes one of the last 5 stages before an outlet of the compressor section.

In another embodiment according to any of the previous embodiments, the compressor includes between 2 and 12 stages.

In another embodiment according to any of the previous embodiments, a clearance between the tip and a fixed structure of the compressor section is greater than 1.5% of the radial span of the airfoil.

In another embodiment according to any of the previous embodiments, the clearance between the tip and a fixed structure of the compressor section is between about 1.5% and 3% of the radial span of the airfoil.

In another featured embodiment, a blade for an axial compressor of a gas turbine engine includes a platform, a tip and an airfoil extending between the platform and the tip. The airfoil includes a root portion adjacent the platform between 0% and 20% of a radial span of the airfoil, a midspan portion between 20% and 65% of the radial span of the airfoil and a tip portion between 65% and 100% of the radial span of the airfoil. Each of the root portion, midspan portion and tip portion define a meridional velocity at stage exit with the tip portion including a first meridional velocity greater than a second meridional velocity through the midspan portion.

In another embodiment according to the previous embodiment, the first meridional velocity produced at stage exit is between 6% and 15% greater than a second meridional velocity through the midspan portion.

In another embodiment according to any of the previous embodiments, a first total pressure within the tip portion at stage exit is greater than a second total pressure across the midspan portion at stage exit.

In another embodiment according to any of the previous embodiments, the first total pressure at stage exit is between 1.2% and 3% greater than a second total pressure across the midspan portion at stage exit.

In another featured embodiment, a method of operating a compressor section of a gas turbine engine includes configuring a blade to include an airfoil having a platform, a tip and an airfoil between the platform and the tip, including a root portion adjacent the platform, a midspan portion and a tip portion. A first meridional velocity is generated across the tip portion of the airfoil greater than a second meridional velocity across the midspan portion.

Another embodiment according to the previous embodiment, includes generating the first meridional velocity with the tip portion that is between 6% and 15% greater than a second meridional velocity through the midspan portion.

Another embodiment according to any of the previous embodiments, includes generating a first total pressure with the tip portion that is greater than a second total pressure across the midspan portion.

In another embodiment according to any of the previous embodiments, the generated first total pressure is between 1.2% and 3% greater than the generated second total pressure across the midspan portion.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
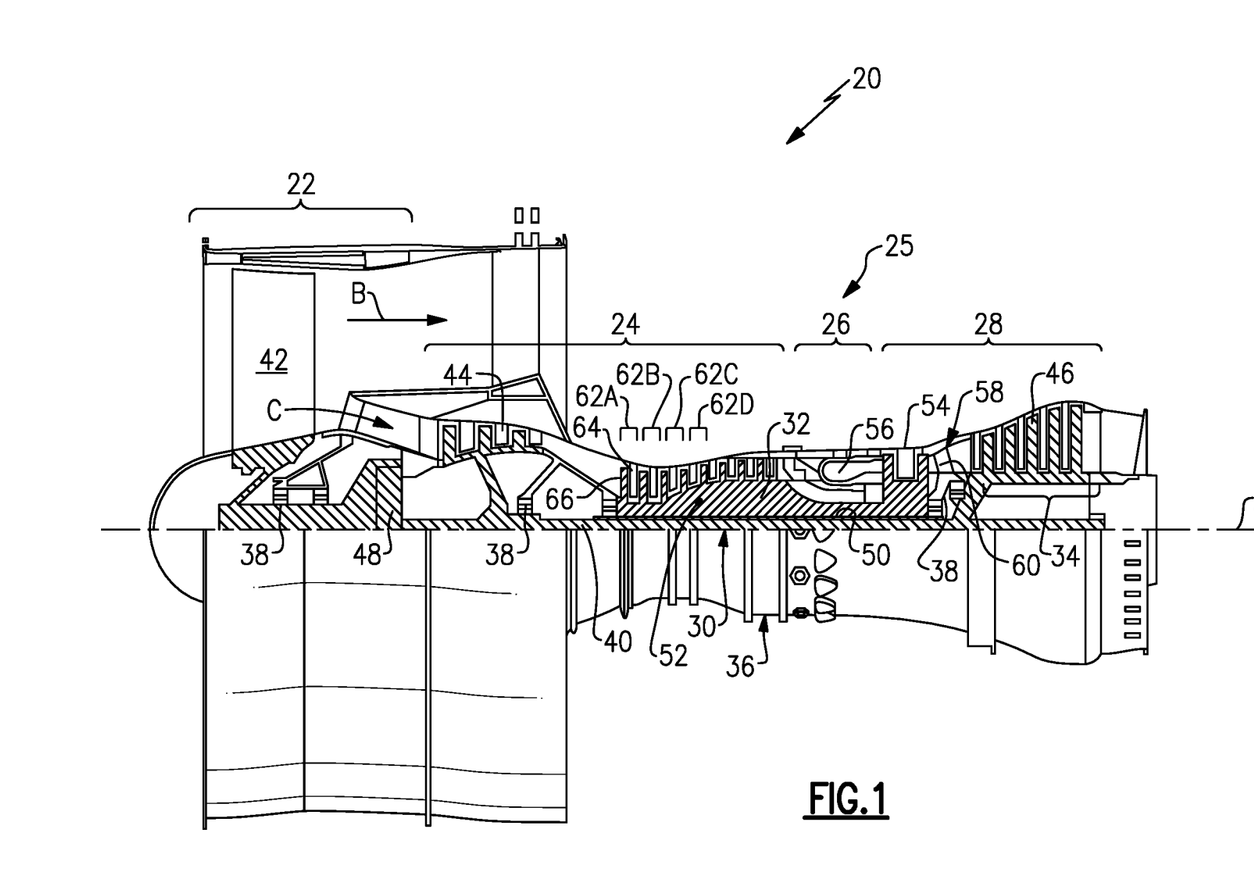
FIG. 1 is a schematic view of an example gas turbine engine.

FIG. 1 schematically illustrates a gas turbine engine 20. The gas turbine engine 20 is disclosed herein as a two-spool turbofan that generally incorporates a core engine section 25 that includes a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10.67 km). The flight condition of 0.8 Mach and 35,000 ft (10.67 km), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350 m/second).

The example gas turbine engine includes the fans section 22 that comprises in one non-limiting embodiment less than about twenty-six (26) fan blades 42. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
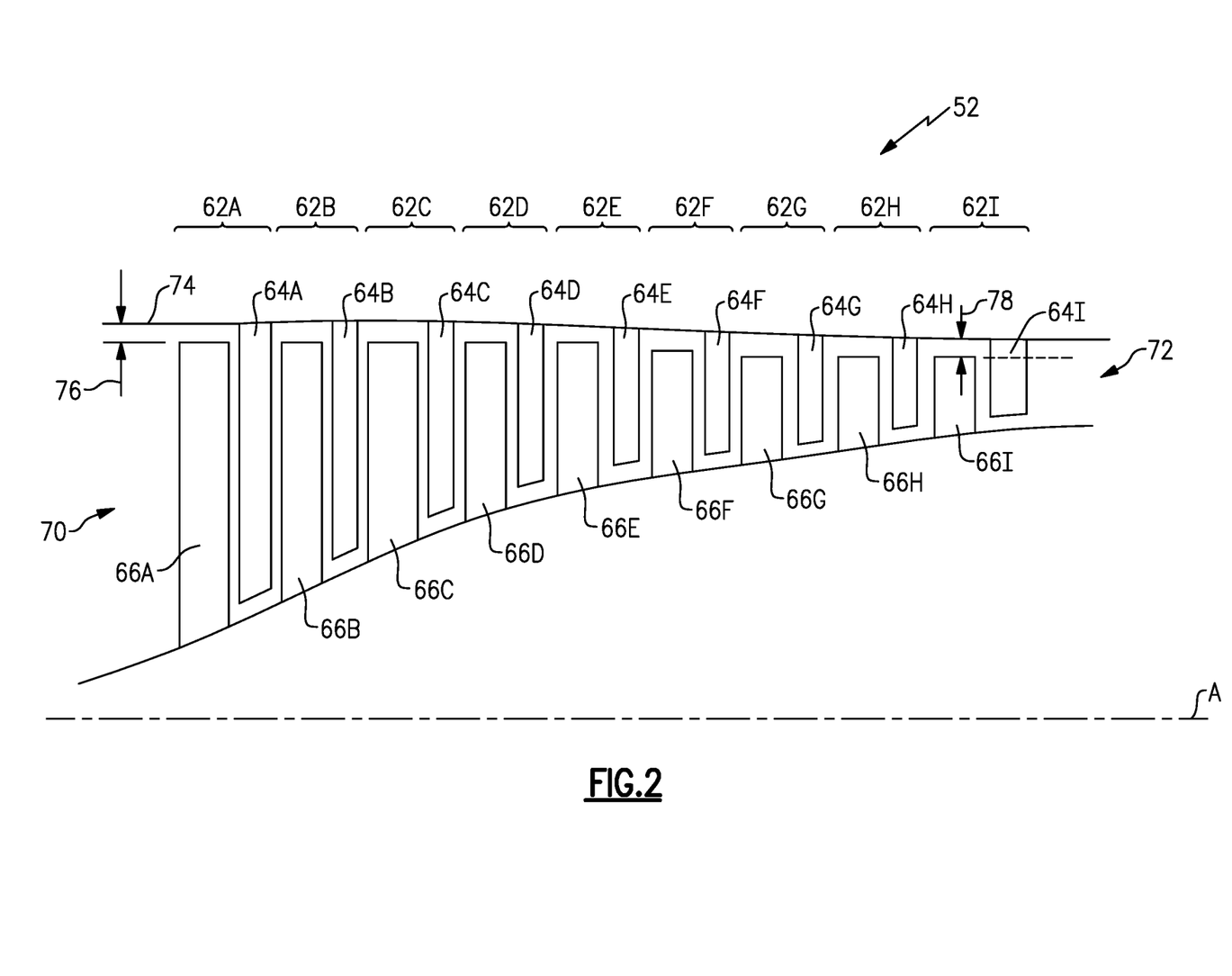
FIG. 2 is a schematic view of an example compressor section.

Referring to FIG. 2 with continued reference to FIG. 1, the high pressure compressor section 52 includes a plurality of stages 62a-i between an inlet 74 and an outlet 72. Each stage 62a-i includes a rotating blade 66a-i and a static vane 64a-i. In this example the compressor section 52 includes nine (9) stages. In another embodiment the compressor section 52 may include between two (2) and twelve (12) stages. Moreover, it should be understood that although the disclosed compressor section 52 embodiment includes nine (9) stages, a compressor with more or less stages may benefit from this disclosure and is within the contemplation of this disclosure.

Clearance gaps 76, 78 between a tip of each compressor blade 66a-i and the housing 74 are present and minimized to increase engine operating efficiency. The size of the gaps 76, 78 are commonly referred to in relationship to a percent of a span of the airfoil. Accordingly, the gaps 76, 78 may be referred to as for example being between 1% and 2% of the overall airfoil span. There is a minimum size clearance between the blades 66a-I and the housing 74 required to accommodate relative non-axial movement caused by mechanical and thermal stress during engine operation.

In the disclosed example, the clearance gap 76 is less than about 2% of airfoil radial span. In other disclosed example, the clearance gap 76 is between about 0.5% and 0.8% of the airfoil radial span. The example clearance gap 78 ratio relative to the airfoil span is greater than that of the clearance gap 76 for the larger blades near the inlet 70. In one disclosed example the clearance gap 78 is greater than about 1.6%. In another example embodiment the clearance gap 78 is between about 2.5% and 3% of the airfoil radial span.

The radial length of each stage 62a-i decreases in a direction from the inlet 70 toward the outlet 72. Gaps for the radially larger stages 62a-i as indicated by the gap 76 are smaller in relationship to the size of the radial airfoil span. As the radial span of the compressor stages 62a-i decreases, the gap becomes larger in relationship to the overall airfoil span as indicated schematically by gap 78. Disadvantageously, the ability to control clearances does not improve at the same rate that a diameter decreases. In other words, the clearance gap to airfoil span ratios increase as the radial span of each stage 62a-I decreases. Accordingly, the gap 78 towards the outlet 72 is larger as a percent of airfoil span compared to the gap 76 towards the inlet of the compressor section 52.

Increases in gaps 76, 78 result in inefficiencies that not only affect the one particular stage 62a-i but can multiply across several stages. Airflows at the tip of the airfoil near the gaps slow relative to airflows radially inward across the airfoil. The slowing of airflow at the airfoil tips generate unintended flow characteristics that propagate through subsequent stages 62a-i. However, simply reducing the clearance gap is limited due to the need to accommodate both mechanical and thermal stresses encountered during engine operation. Accordingly, alternate methods and structures are needed to improve compressor efficiency.

Figure 3:
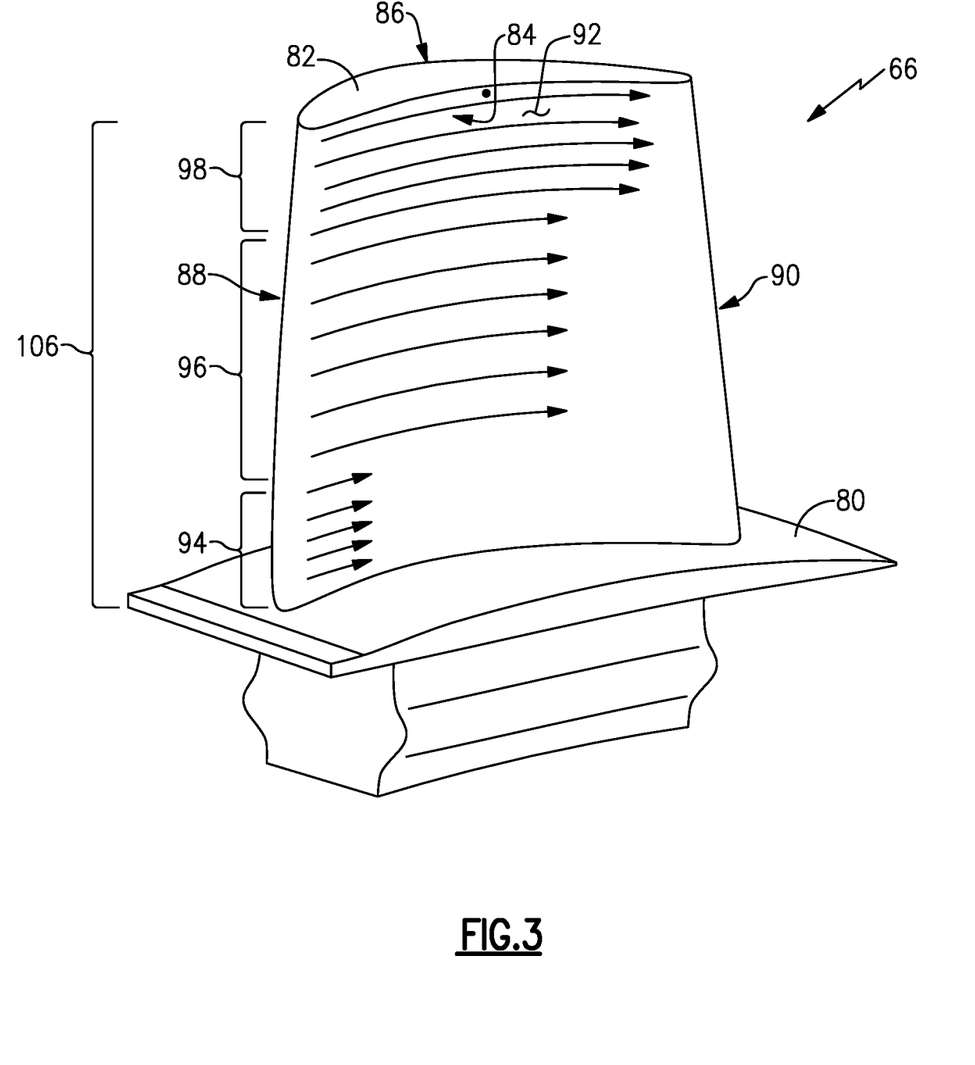
FIG. 3 is a schematic view of an example compressor blade.

Referring to FIG. 3 with continued reference to FIG. 2, an example compressor blade 66 is illustrated and includes a platform 80, a tip 82 and an airfoil 92 having a pressure side 84 and a suction side 86 extending between the platform 80 and the tip 82. The airfoil 92 includes a leading edge 88 and a trailing edge 90. A radial span of the airfoil 92 is schematically indicated at 106 and includes several portions. In the disclosed embodiment, the airfoil 92 is divided into a root portion 94, a midspan portion 96 and a tip portion 98. As appreciated, the specific relationship and span ratios for each of the root portion, mid-span portion and tip portion are disclosed by way of example and other divisions and sizes of each portion for other airfoil configurations are within the contemplation of this disclosure.

The example compressor blade 66 includes an airfoil 92 shape that generates desired velocity and pressure profiles across the radial span 106 between the platform 80 and the tip 82. The velocity and pressure profiles are indicative of air flows across the airfoil 92 from the leading edge 88 toward the trailing edge 90. The gap clearances 76, 78 influence the velocity and pressure profiles as well as the specific configuration of the airfoil 92.

An airfoil shape may be defined as series of x, y and z coordinates along the radial span. The specific airfoil shape is determined to provide desired velocity and pressure profiles. Accordingly, the physical geometry of the example blade 66 may be described and disclosed by specific velocity and pressure profiles.

Figure 4:
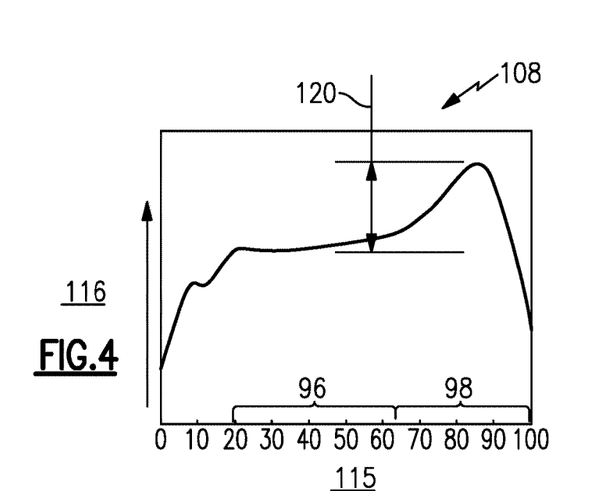
FIG. 4 is a graph illustrating an example airfoil pressure profile.

Referring to FIG. 4 with continued reference to FIGS. 2 and 3, a total pressure profile 108 is shown including a total pressure 116 for a given percent of the airfoil span indicated 115. The disclosed span 115 begins at 0% adjacent the platform 80 and extends radially outward to 100% span at the tip 82. The total pressure 116 is a normalized pressure value across the airfoil at the radial span 115.

The example blade 66 is configured to generate the pressure profile 108 with a bias toward an increase in pressure within the tip portion 98 of the radial span 106 compared to the midspan portion 96 as indicated at 120. In the disclosed example, the tip portion 98 extends from 65% to 100% of the radial span 106 of the airfoil 92. The midspan portion extends from between 20% and 65% of the radial span 106.

The disclosed blade 66 is configured to generate the disclosed pressure profile 108 with the highest pressures biased within the tip portion 98 of the radial span 106. In one disclosed example, the total pressure 116 within the tip portion 98 is between about 1.2% and 3% greater than the total pressure 116 within the midspan portion 96 as indicated at 120. In another example embodiment, the total pressure in the tip portion 98 is between about 1.2% and 1.8% greater than the total pressure in the midspan portion 96.

Figure 5:
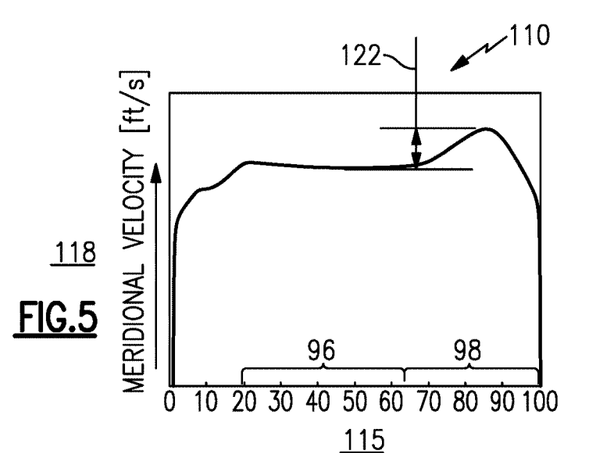
FIG. 5 is a graph illustrating an example airfoil velocity profile.

Referring to FIG. 5 with continued reference to FIGS. 2-4, the total pressure profile 108 generates a desired airflow velocity profile 110 along the radial span 106 of the blade 66. The airflow flow velocity 118 is biased to have increased velocities toward the tip 82 to overcome airflow degradation caused at the clearance gap 78. The disclosed velocity 118 is the meridional velocity and is a measure of velocity within a plane defined along the engine axis A and the radial plane of the airfoil 92. The meridional velocity does not include the circumferentially directed component of flow through the compressor section 52.

The meridional velocity within the tip portion 98 is greater than the meridional velocity within the midspan portion 96. In this embodiment, the meridional velocity 118 within the tip portion 98 is greater than the meridional velocity within the midspan portion 96 by a quantity indicated at 122. In one disclosed embodiment, airflow velocities within the tip portion 98 are between 6% and 15% greater than velocities within the midspan portion 96. In another disclosed embodiment, velocities within the tip portion 98 are between about 6% and 10% greater than the velocities within the midspan portion 96.

In the example embodiment, at least one of the stages 62*a*-I includes a blade 66 that provides the disclosed total pressure and velocity profiles 108, 110. In this example the compressor section 52, the profile 108 and velocity profile 110 are set up at the inlet to the eighth stage 62H by previous blade stages 62*a*-G. The eighth stage 62H then propagates the total pressure profile 108 and velocity profile 110 of the eight stage 62H to the subsequent stages. In this example, the ninth stage 62I immediately downstream of the eighth stage 62H. The ninth stage 62I is the last stage of the compressor section 52 and benefits from the airfoil configuration of the eighth stage 62H.

Figure 6:
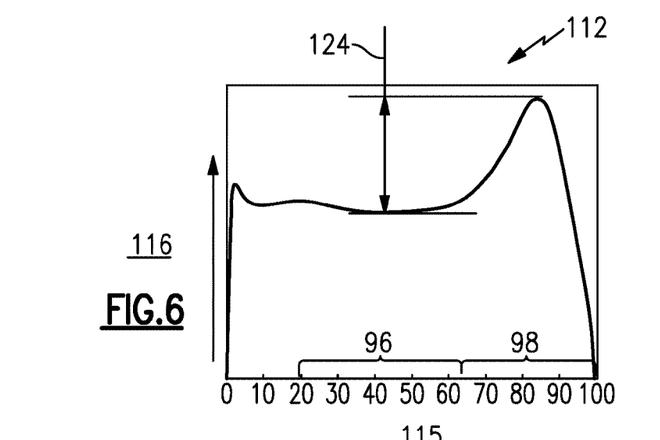
FIG. 6 is a graph illustrating another example airfoil pressure profile.
Figure 7:
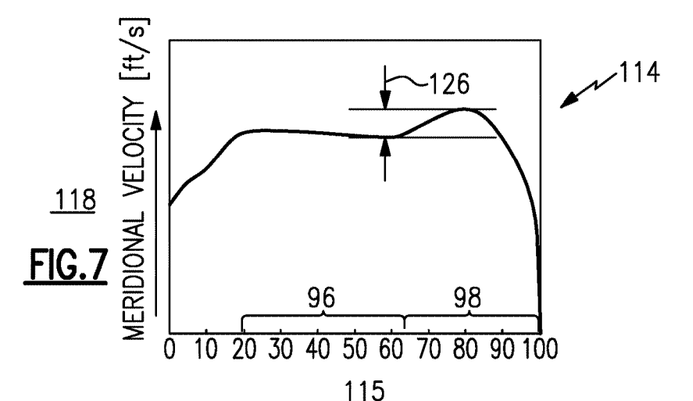
FIG. 7 is a graph illustrating another airfoil velocity profile.

Referring to FIGS. 6 and 7 with continued reference to FIGS. 2-5, FIG. 6 illustrates a total pressure profile 112 for the ninth stage 62I. FIG. 7 illustrates a velocity profile 114 of the ninth stage 62I. The ninth stage 62I of the compressor section does not include an airfoil with the same configuration as the eight stage 62H but still benefits from the favorable airflow velocities generated by blade 66. The total pressure profile 112 of the ninth stage 62I includes an increased total pressure indicated at 124 within the tip portion 98 as compared to the midspan portion 96. The pressure profile 112 results in the corresponding velocity profile 126 (FIG. 7). The velocity profile 114 includes an increase, indicated at 126, in velocities within the tip portion as compared to the midspan portion 96. The increases in total pressure 124, and airflow velocity 126 are a result of the airfoil configuration provided by the eight stage blade 62H. Accordingly, the beneficial configuration provided by the tip biased velocities upstream of the blade 62H propagate downstream to further improve efficiencies in later compressor stages.

Accordingly, the example airfoil configuration generates an increase in velocities near the tip portion of later stages of a compressor to inhibit and minimize air flow disturbances generated by increased clearances.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A compressor section for a gas turbine engine comprising:
   a plurality of blade stages including a first blade stage and a second blade stage immediately downstream of the first blade stage, wherein the first blade stage includes a blade including:
   a first platform;
   a first tip;
   a first leading edge and a first trailing edge extending between the first platform and the first tip; and
   a first airfoil extending between the first platform and the first tip, the first airfoil including a first root portion adjacent to the first platform, a first midspan portion and a first tip portion, wherein the first airfoil includes a first airfoil shape defined as a series of coordinates that provide a meridional velocity profile across a second airfoil within the second blade stage within each of a second root portion, a second midspan portion and a second tip portion of airflow flowing across the second airfoil of the second blade stage from a second leading edge to a second trailing edge during operation of the compressor section,
   wherein each of the first tip portion and the second tip portion comprises between 65% and 100% of a radial span of the corresponding one of the first airfoil and the second airfoil and each of the first midspan portion and the second midspan portion comprises between 20% and 65% of the radial span of the airfoil and the first airfoil shape within the first tip portion is configured to provide a first meridional velocity in the second blade stage outside of the second midspan portion that increases relative to a second meridional velocity at 50% of the radial span within the second midspan portion in a direction away from the second midspan portion in the second blade stage; and wherein the second blade stage includes a second airfoil shape different than the first airfoil shape and the first meridional velocity is between 6% and 15% greater than the second meridional velocity through the second midspan portion.

2. The compressor section as recited in claim 1, wherein a first total pressure within the second tip portion is greater than a second total pressure within the second midspan portion.

3. The compressor section as recited in claim 2, wherein the first total pressure is between 1.2% and 3% greater than the second total pressure within the second midspan portion.

4. The compressor section as recited in claim 1, wherein the compressor section includes a plurality of stages and the first blade and the second blade comprise portions of at least two of the plurality of stages of the compressor section.

5. The compressor section as recited in claim 4, wherein the at least two of the plurality of stages of the compressor section comprises at least two of the last 5 of the plurality of stages of the compressor section before an outlet of the compressor section.

6. The compressor section as recited in claim 4, wherein the compressor comprises between 2 and 12 stages.

7. The compressor section as recited in claim 1, wherein a clearance between each of the first tip and the second tip and a fixed structure of the compressor section is greater than 1.5% of the radial span of the airfoil.

8. The compressor section as recited in claim 1, wherein the clearance between the first tip and the second tip and a fixed structure of the compressor section is between 1.5% and 3% of the radial span of the corresponding first airfoil and the second airfoil.

9. A method of operating a compressor section of a gas turbine engine, the method comprising:
   configuring a first blade to include a first platform, a first tip, a first leading edge, a first trailing edge and a first airfoil that includes a first root portion adjacent the first platform, a first midspan portion and a first tip portion;
   configuring a second blade downstream of the first blade to include a second platform, a second tip, a second leading edge, a second trailing edge and a second airfoil between the second platform and the second tip, the second airfoil including a second root portion adjacent the second platform, a second midspan portion and a second tip portion, wherein each of the first tip portion and the second tip portion comprises between 65% and 100% of a radial span of the corresponding one of the first airfoil and the second airfoil and each of the first midspan portion of the first airfoil and the second midspan portion of the second airfoil comprises between 20% and 65% of the radial span of the corresponding first airfoil and the second airfoil;

configuring a surface of the first airfoil for generating a first meridional velocity across the tip portion of the second blade that increases within the tip portion of the second blade in a direction toward the tip of the second blade relative to a second meridional velocity at 50% of the radial span within the midspan portion of the second blade portion for a common airflow from the first blade across the airfoil of the second blade flowing from the leading edge toward the trailing edge of the second blade; and generating the first meridional velocity within the tip portion of the second blade that is between 6% and 15% greater than the second meridional velocity through the midspan portion of the second blade.

10. The method as recited in claim 9, including generating a first total pressure within the tip portion of the second blade that is greater than a second total pressure within the midspan portion of the second blade.

11. The method as recited in claim 10, wherein the generated first total pressure is between 1.2% and 3% greater than the generated second total pressure within the midspan portion of the second blade.

12. The compressor section as recited in claim 1, wherein the first meridional velocity is between 6% and 10% greater than the second meridional velocity through the second midspan portion.

13. The compressor section as recited in claim 1, wherein the plurality of blade stages comprise nine blade stages and the first blade stage and the second blade stage comprise the eighth blade stage and the ninth blade stage respectively.

14. The compressor section as recited in claim 1, wherein the first airfoil shape is defined as series of x, y and z coordinates along the radial span between the first platform and the first tip.

15. The compressor section as recited in claim 1, wherein the compressor section comprises a high pressure compressor section disposed aft of a low pressure compressor section.

16. The compressor section as recited in claim 15, wherein the high pressure compressor is coupled to a high pressure turbine and the low pressure compressor section is coupled to a low pressure turbine disposed aft of the high pressure turbine.

17. The compressor section as recited in claim 2, wherein the first total pressure is between 1.2% and 1.8% greater than the second total pressure within the second midspan portion.

18. The method as recited in claim 10, wherein the generated first total pressure is between 1.2% and 1.8% greater than the generated second total pressure within the midspan portion of the second blade.

19. The method as recited in claim 11, further comprising configuring the compressor to comprise nine blade stages with the first blade and the second blade disposed within the eighth blade stage and the ninth blade stage respectively.

20. The method as recited in claim 9, further comprising setting a clearance between each of the first tip and the second tip and a fixed structure of the compressor section to be greater than 1.5% of the radial span of a corresponding one of the first blade and the second blade.

* * * * *